United States Patent [19]

Smith et al.

[11] Patent Number: 5,368,942
[45] Date of Patent: Nov. 29, 1994

[54] METHOD OF ADHERING SUBSTRATES

[75] Inventors: Douglas T. Smith, Gaithersburg; Alexis Grabbe, Germantown, both of Md.; Roger G. Horn, Joslin, Australia

[73] Assignee: The United States of America as represented by the Secreatary of Commerce, Washington, D.C.

[21] Appl. No.: 5,217

[22] Filed: Jan. 15, 1993

[51] Int. Cl.$^5$ .............................................. B32B 7/04
[52] U.S. Cl. ................... 428/420; 156/152; 156/273.1; 156/306.3; 156/310
[58] Field of Search ............ 156/310, 153, 152, 273.1, 156/306.3, 307.1; 428/420; 29/900

[56] References Cited

U.S. PATENT DOCUMENTS

| | | | |
|---|---|---|---|
| 3,589,931 | 6/1971 | Marzocchi et al. | 117/72 |
| 3,773,607 | 11/1973 | Marzocchi | 161/176 |
| 3,788,895 | 1/1974 | Schimmer et al. | 428/420 |
| 3,824,148 | 7/1974 | Lopatin | 161/188 |
| 3,892,614 | 7/1975 | Levy | 156/272 |
| 4,082,551 | 4/1978 | Steklenski et al. | 428/420 |
| 4,376,797 | 3/1983 | Howse | 427/302 |
| 4,615,948 | 10/1986 | Luxon | 428/420 |
| 4,715,919 | 12/1987 | Fakirov et al. | 428/420 |

OTHER PUBLICATIONS

Horn et al., "Surface Forces and . . . Between Silica Sheets," Chem. Physics Letters, 162:4.5, pp. 404–408 (1989).
Fowkes et al., "Acid-base Properties of Glass Surfaces," Journal of Non-Crystalline Solids, 120:47–60 (1990).
Yablonovitch et al., "Van der Waals bonding . . . onto arbitrary substrates," Appl. Phys. Lett. 56(24), 2419–2421 (1990).
Smith, "Measuring contact charge . . . new experimental technique," Journal of Electrostatics, 26:291–308 (1991).
Horn et al., "Contact Electrification and Adhesion Between Dissimilar Materials," Science, vol. 256, pp. 362–364 (1992).
"Fundamentals of Adhesion," Lee, ed., Plenum Press, pp. 21–23, 249–290, 349–362 (1991).
Plueddemann, "Silane Coupling Agents," 2nd ed., Plenum Press, pp. 18–23, 3147, 86–89, 100–107, 120–135, 221–225 (1991).

*Primary Examiner*—John J. Gallagher
*Attorney, Agent, or Firm*—Leydig, Voit & Mayer

[57] ABSTRACT

A method of adhering two substrates comprising covalently modifying a smooth surface of at least one of the substrates is disclosed. A smooth surface of a first substrate is covalently modified to present groups, which are one member of an acid-base pair (MABP groups). The covalently modified surface is contacted with a smooth surface of a second substrate. The smooth surface of the second substrate presents groups are the acid-base complement of the MABP groups (MABP complements). The interaction of the MABP groups with the MABP complements results in the formation of an adhesive bond between the smooth surface of the second substrate and the covalently modified surface of the first substrate. The MABP complements may inherently be present on the surface of the second substrate or the surface of the second substrate may be modified to present the MABP complements.

27 Claims, No Drawings

METHOD OF ADHERING SUBSTRATES

TECHNICAL FIELD OF THE INVENTION

The present invention relates to a method of adhering substrates and to an article formed by the method. In particular, the method of adhering substrates includes covalently modifying a surface of at least one of the substrates.

BACKGROUND OF THE INVENTION

In many applications, particularly those involving electronic or optical materials, it is frequently desirable to adhere two substrates together in a manner that avoids substantially altering the properties of the substrates at their interface.

There are a variety of ways of adhering two substrates together. One common method involves coating a surface of at least one of the substrates with a relatively thick layer of an adhesive prior to bringing the substrates into contact. While this method may produce a joint with good mechanical strength, the presence of the layer of adhesive may alter, sometimes dramatically, the physical characteristics of the substrates or the substrate-substrate interface. This can be a particular problem in electronic applications which have exacting requirements and often entail bonding very thin sheets of material.

Van der Waals forces have been utilized to bond two substrates together without the addition of an adhesive. Van der Waals forces, however, are relatively weak and are easily disrupted by environmental contaminants. To achieve any significant bonding by dispersion forces alone requires exceedingly clean, exceedingly smooth surfaces. In addition, van der Waals forces drop off rapidly with separation (e.g., decrease as $1/D^3$ for two flat planes, where D is distance). These factors make the range of applications and materials to which bonding based on van der Waals forces can be applied, extremely limited.

Acid-base interactions offer the potential to form a stronger, less environmentally sensitive adhesive bond, i.e., an adhesive bond which is less sensitive to the presence of contaminants. Thus far, this approach has been confined to the application of relatively thick interaction layers onto substrates, to interdiffused polymers, and to polymer-surface adhesion (e.g., the enhancement of the adhesion of paints or coatings to a metal substrate). All of these techniques can substantially alter the physical characteristics of the adhered substrates and/or the article produced. In particular, these methods of adhering substrates may substantially alter the dielectric, optical, thermal or mechanical properties of the substrates or of the substrate-substrate interface.

It is therefore an object of the invention to provide a method of adhering substrates to form an article without substantially altering the physical characteristics of the substrates. More particularly, it is an object of the invention to provide a method of adhering substrates which does not substantially alter the dielectric, optical, thermal or mechanical properties of the substrates in the vicinity of the substrate-substrate interface.

It is a further object of the invention to provide an article including two substrates, which are strongly bonded together despite the lack of a discrete, substantial adhesive layer between the substrates.

It is another object of the invention to provide a method of adhering two substrates, which have substantially identical physical properties, to construct an article. For example, the method permits the adhering substrates, which are formed from identical material, to form an article which has very similar physical properties to that of a single substrate formed from the material.

It is yet another object of the invention to provide a method of adhering substrates in such a manner that the substrates may be separated and readhered without any further application of an adhesive. Further, another object is to provide a method of adhering substrates that forms an adhesive bond between the substrates that is capable of reforming after rupture due to shear.

These and other objects and advantages of the present invention will be apparent from the description of the invention which follows.

SUMMARY OF THE INVENTION

The present invention provides a method of adhering substrates which includes covalently modifying a smooth surface of a first substrate to present groups, which are one member of an acid-base pair (MABP groups), and contacting the covalently modified surface with a smooth surface of a second substrate. The smooth surface of the second substrate presents groups, which are the acid-base complement of the MABP groups (MABP complements), i.e., the other member of the acid-base pair. When the smooth surface of the second substrate is brought into contact with the covalently modified surface, the two surfaces adhere.

According to another aspect, the present invention includes a method of adhering substrates comprising modifying a smooth surface of a first substrate by covalently bonding a monolayer of a modifying agent to the surface and contacting the covalently modified surface with a smooth surface of a second substrate. The modifying agent includes a MABP group and the smooth surface of the second substrate presents MABP complements.

The present invention also provides an article which comprises a first substrate including a smooth surface, which is covalently modified to present MABP groups, and a second substrate, which includes a smooth surface which presents MABP complements. The smooth surface of the second substrate is adhered to the covalently modified surface of the first substrate.

DETAILED DESCRIPTION OF THE INVENTION

The present invention provides a method of adhering substrates. One embodiment of the method comprises covalently modifying a smooth surface of a first substrate to present MABP groups. The covalently modified surface is contacted with a smooth surface of a second substrate, which presents MABP complements. When the two smooth surfaces are brought into contact, the surfaces adhere to each other. The mechanism of this adhesion is not completely understood, but it is believed that when the two surfaces are brought into contact, charge transfer between the two surfaces occurs due to proton transfer between the MABP groups and the MABP complements.

The substrates in the method of the present invention may be configured in any one of a large variety of shapes, including sheets, blocks or more complex shapes. Each substrate is configured to include at least one smooth surface. The precise configuration of the substrates for any given application will obviously depend on the particular requirements of that application. The method is especially useful for adhering substrates where at least one of the substrates is a thin sheet.

The substrates may be formed from any material that is capable of being fashioned to include a smooth surface. At least one of the substrates is formed from a material that is capable of being covalently modified to present MABP groups or to bond a monolayer of a modifying agent to a surface of the substrate. Typically, the substrates are formed from nonmetallic materials and preferably from nonmetallic, inorganic materials. Preferably, at least ore of the substrates is formed from a material which is resistant to electronic breakdown. Electronic breakdown could give rise to the formation of a conductive path through the substrate, which may lead to a dissipation of surface charge and hinder the formation of an adhesive bond to another substrate. More preferably, at least one of the substrates is formed from an insulating material. Exemplary materials which may be used to form the substrates include silica, oxidized silicon (e.g., a silicon wafer with a surface layer of native oxide), alumina, titanium oxide, chromium oxide, tin oxide, germanium oxide, and silicate-containing materials (e.g., calcium silicate, borosilicate or aluminosilicate). Preferably, the substrates comprise silica or oxidized silicon.

In a preferred embodiment, the first substrate, which includes the smooth surface to be covalently modified to present MABP groups, is formed from silica. Other materials, which the first substrate may preferably comprise, include oxidized silicon and germanium oxide. In another preferred embodiment, the first and second substrates both comprise a silicate-containing material, and preferably both comprise silica.

The substrates to be adhered in accordance with the present invention each have at least one smooth surface. For the purposes of the present invention, a smooth surface is one which, when brought into contact with a second smooth surface, permits a sufficient number of contact points between the two surfaces to allow an adhesive interaction to occur. It will be appreciated that, when two surfaces are brought into contact, the actual contact points occur where the asperities of the surfaces touch. Smoother surfaces are capable of entering into a greater number of contact points per unit area than comparatively rougher surfaces. The number of contact points at an interface, which includes a comparatively rough surface, may be increased by compressively loading the interface, thereby compacting the asperities and permitting the transfer of additional charge. The compressive loading of the interface may result in a reduction of the roughness of the surface.

Some materials may be naturally available with a surface having the desired smoothness. With other materials, a surface having the desired surface smoothness may be prepared by one of a number of known processsing methods, including machining processes, such as mechanical polishing; chemical processes, such as chemical polishing; low energy ion bombardment; and processes involving heat treatment. Heat treatment processes typically include heating a substrate to a temperature at which the substrate becomes somewhat plastic and subsequently cooling the substrate to a temperature at which the substrate is substantially rigid. Substrates, which have a smooth surface formed by heat treatment, are preferably used in applications at a temperature where they remain substantially rigid.

Typically, the smooth surfaces of the present invention have a surface roughness of no more than about 5.0 nm RMS roughness and preferably of no more than about 2.0 nm RMS roughness (as measured by atomic force microscopy). Most preferably, the smooth surfaces of the present invention have a surface roughness of no more than about 0.5 nm RMS roughness.

The smooth surface of the first substrate is covalently modified to present MABP groups. The MABP groups are one member of an acid-base pair, where acid and base are defined in terms of the Bronsted-Lowry theory of acid-base interaction. Under the Bronsted-Lowry theory, an acid is defined as a proton donor and a base is defined as a proton acceptor. The base has a pair of electrons available to share with the proton. This pair of electrons is usually present as an unshared pair but may be present in a $\pi$ orbital of the base.

The MABP groups may be either basic groups, i.e., proton acceptor groups, or acidic groups, i.e., proton donor groups. In a preferred embodiment, the MABP groups include basic groups (i.e., proton acceptor groups) and more preferably amino groups.

For the purposes of the present invention, the phrase "basic groups" is defined to include at least one type of proton acceptor group but may include more than one type of proton acceptor group. Examples of proton acceptor groups include amino groups, (e.g., aliphatic amino groups, cycloaliphatic amino groups, aromatic amino groups), amidine groups and nitrogen-containing heterocyclic aromatic groups (e.g., pyridine groups, imidazole groups, quinoline groups). The amino groups may include but are not limited to primary amino groups, secondary amino groups, tertiary amino groups or a mixture thereof.

Similarly, the phrase "acidic groups" is defined to include at least one type of proton donor group but may include more than one type of proton donor group. Examples of proton donor groups include but are not limited to carboxy groups, phenolic groups and groups which include —SiOH (silanol groups), —SH (e.g., thiol or thiophenol groups), —SO$_3$H, —PO$_3$H$_2$, —BOH or —GeOH. Other examples of surfaces which present groups which may act as acidic groups include hydrated metal oxides having amphoteric hydroxyl groups (such as —FeOH, —SnOH or —AlOH).

The MABP complements are the acid-base complement (in the Bronsted-Lowry proton donor-proton acceptor sense) of the MABP groups. In other words, if the MABP groups are proton acceptor groups (basic groups), the MABP complements are proton donor groups (acidic groups). Alternatively, if the MABP groups are proton donor groups (acidic groups), the MABP complements are proton acceptor groups (basic groups). In a preferred embodiment of the present invention, the smooth surface of the first substrate is covalently modified to present proton acceptor groups and the smooth surface of the second substrate presents proton donor groups. Preferably, the covalently modified surface presents amino groups and the smooth surface of the second substrate presents amphoteric hydroxyl groups, more preferably silanol groups.

The smooth surface of the first substrate may be covalently modified to present MABP groups by reacting a modifying reagent with the surface. The modifying reagent typically includes a reactive functional group, a spacer group and at least one MABP group. For the purposes of this invention, a reactive functional group is a group which is capable of reacting with a reactive site (e.g., a surface —OH group) on the surface of the substrate. Exemplary compounds which may be used as a modifying reagent include aminoalkyldialkylalkoxysilanes, such as 3-aminopropyldimethylethoxysilane or N-(2-aminoethyl)-3-aminopropyldimethylethoxysilane.

The modifying reagent may include more than one reactive functional group. Such reagents, however, are more prone to polymerization on the surface, which may lead to an increase in surface roughness or to a buildup of a thicker reagent layer, i.e., a layer having more than a monolayer of reagent. Either of these effects may alter the physical characteristics of the interface or may weaken adhesion between the modified surface and another surface. Preferably, the modifying reagent is a compound which only has a single reactive functional group. One suitable modifying reagent, having a single reactive functional group, is an aminoalkyldialkylalkoxysilane (the alkoxy group). Modifying reagents, which have only a single reactive functional group, are capable of reacting with substantially all of the reactive sites present on the substrate surface while avoiding polymerization. In addition to reacting with the reactive sites on the substrate surface, a modifying reagent may react with a second molecule of modifying reagent to form a dimer. Such dimers, which are generally only adsorbed and not covalently bonded to the surface, typically may easily be removed from the modified surface, e.g., by rinsing the surface with an appropriate solvent.

The modifying reagent may be reacted with the surface by any suitable method, including, for example, treating the surface with a solution of the modifying reagent or vapor phase treating the surface with the modifying reagent. Vapor phase treatment is preferred, since the potential for side reaction or polymerization of the modifying reagent is lessened. Vapor phase treatment also reduces the chance of particulate contamination of the surface and permits greater control over the fraction of reactive sites modified.

The method of the present invention includes reacting a sufficient number of reactive sites on the surface with a modifying reagent, which includes a MABP group, to permit the modified surface to adhere to a surface which presents MABP complements. The reaction of the modifying reagent may result in the surface being substantially covered with a modifying agent, which is covalently bonded to the surface. In one embodiment of the invention, substantially all of the reactive sites on the surface are reacted with the modifying reagent. In another embodiment of the invention, the reaction of the modifying reagent with the surface produces monolayer of the modifying agent covalently bonded to the surface. Typically, adhesion between the two surfaces occurs if their interaction leads to the transfer of charge and produces a charge density on each of the surfaces of at least about $1.0$ mC/m$^2$, preferably of at least about $2.0$ mC/m$^2$, and more preferably of at least about $3.5$ mC/m$^2$.

The smooth surface of the second substrate may inherently present MABP complements. For example, many metal oxides and other nonmetallic inorganic materials present amphoteric hydroxyl (—OH) groups at their surface. The amphoteric hydroxyl groups are proton exchange groups which may serve either as proton donor groups (acidic groups) or as proton acceptor groups (basic groups) depending on the nature of the group or groups with which the amphoteric hydroxyl groups interact. In other words, the amphoteric hydroxyl groups may serve as the acid-base complement of either an acidic (proton donor) group or a basic (proton acceptor) group. A surface which presents amphoteric hydroxyl groups may be adhered to a substrate surface which has been covalently modified to present proton acceptor groups (basic groups), in which case the amphoteric hydroxyl groups serve as proton donor groups. A surface presenting amphoteric hydroxyl groups may also be adhered to a substrate surface which has been covalently modified to present proton donor groups (acidic groups), in which case the amphoteric hydroxyl groups serve as proton acceptor groups.

Alternatively, the surface of the second substrate may be modified to present the MABP complements. In another embodiment, the smooth surface of the second substrate may be modified by covalently bonding a monolayer of a modifying agent, which includes a MABP complement, to the surface. These modifications may be carried out by the methods, described above, used to covalently modify a surface to present MABP groups (since both MABP groups and MABP complements may be either an acidic or a basic group in a given situation).

When the covalently modified surface, which presents MABP groups, is brought into contact with the smooth surface of the second substrate, which presents MABP complements, the two surfaces adhere. Typically, prior to contact neither surface carries any appreciable amount of charge. Once the two surfaces are brought into contact, charge transfer between the surfaces occurs. It is believed that proton transfer between the MABP groups and the MABP complements occurs as a result of the transfer of a proton from the acid to the base of the complementary Bronsted-Lowry pair. Such a process would generate two charged species, the conjugate base of the proton donor (i.e., the deprotonated acid) and the conjugate acid of the proton acceptor (i.e., the protonated base). The net result would be to build up a charge on each of the surfaces that is proportional to the number of MABP group/MABP complement pairs that come into contact.

When two surfaces adhered by the present method are separated, a partial electric discharge across the gap between the separating surfaces may occur as some of the transferred surface charge recombines during the separation process. Because the two surfaces continue to retain the MABP groups and the MABP complements, however, if the surfaces are brought back into contact, charge transfer occurs again, thereby readhering the surfaces. This allows the surfaces to be separated and readhered repeatedly without damage or reduction in their adhesion. The adhesion of two surfaces, grounded in an interaction of acidic and basic groups, is also capable of reforming after rupture due to shear.

In another embodiment of the invention, the smooth surface of the first substrate may be modified by covalently bonding a monolayer of a modifying agent, which includes a MABP group, to the surface. The covalent modification of the surface may be carried out, for example, by allowing a controlled amount of a modifying reagent to react with the surface. The modifying reagent includes a spacer group, at least one MABP group and at least one covalently reactive functional group. Preferably, the modifying reagent has only one covalently reactive functional group. For the purposes of the invention, monolayer is defined as a layer which has the thickness of a single molecule or group and which substantially covers and, preferably, entirely covers a surface. The monolayer of the modifying agent is preferably configured to present the MABP groups. In a preferred embodiment, the smooth surface of the first substrate is modified by covalently bonding a monolayer of a modifying agent, which includes a proton acceptor group, more preferably an amino group.

Typically, the spacer group of a modifying reagent is quite small, containing no more than six or seven carbon atoms and preferably no more than two to four carbon atoms. If the spacer group is too large it may be possible for the MABP group to wrap around and become buried, such that the MABP group is no longer exposed. This would decrease the number of groups available to interact with the second surface, thus weakening adhesion.

In addition, if the size of the spacer group is kept quite small, the thickness of the monolayer may be minimized. The covalently bonded monolayers of the present invention are quite thin, preferably no more than about 2.0 nm thick and more preferably no more than about 1.0 nm thick. Substrate-substrate interfaces which include such thin monolayers exhibit very little alteration of their physical properties (relative to the original substrate materials).

The method of the present invention is particularly useful for adhering substrates without substantially altering the dielectric, optical, thermal, or mechanical properties of the substrates in the vicinity of the substrate-substrate interface. For those applications where the thermal properties of the substrate-substrate interface are important, the thickness of the monolayer at the substrate-substrate interface may be critical. Heat transfer through a layer is inversely proportional to the thickness of the layer, i.e., the presence of a relatively thick adhesive layer with poor thermal conductivity could dramatically alter the thermal properties of a substrate-substrate interface. The method of the present invention provides a means of adhering substrates with a minimal effect on the thermal properties of the substrates or the substrate-substrate interface.

Where a discrete, substantial adhesive layer is present between two substrates, the layer may expand or contract during curing or may have a different thermal expansion coefficient from one of the substrates. Either of these effects may result in the creation of internal mechanical stresses within the substrate(s) and/or adhesive layer, thereby weakening the adhesive bond. In contrast, the adhesive bond formed between two substrates by the present method is capable of reforming after rupture due to shear and does not introduce mechanical stresses at the substrate-substrate interface.

The method may be useful in forming articles to be employed in a number of different applications, and in particular, in applications involving electronic or optical materials. For instance, the method of the present invention may be used to bond a dielectric cover to a semiconductor die, to bond a thin semiconductor die to a smooth dielectric substrate or to bond a semiconductor to the waveguide of an optical device. Other applications where the method of the present invention may be employed include the construction of optical devices. The present method also provides a method of adhering two substrates, which are formed from identical material, without requiring the presence of an additional substantial layer of adhesive material between the two substrates.

The present method may also be effective for bonding two different materials which have different thermal expansion coefficients but must be able to survive thermal cycling. During thermal cycling, adhered materials with differing thermal expansion coefficients may expand or contract at different rates, thereby producing a shearing force which may rupture the adhesive bonds between the two materials. Because the two surfaces continue to retain the MABP groups and the MABP complements, the adhesive bond between the substrates is capable of reforming after rupture due to shear.

The present invention also provides an article which comprises a first substrate which includes a smooth surface covalently modified to present MABP groups, and a second substrate, which includes a smooth surface which presents MABP complements. The smooth surface of the second substrate is adhered to the covalently modified surface of the first substrate. Typically, the substrates comprise a nonmetallic, inorganic material. Preferably the substrates comprise silica, oxidized silicon, alumina, titanium oxide, chromium oxide, tin oxide, germanium oxide, wollastonite, and other silicate-containing materials, and more preferably the substrates are formed from silicon having a surface layer of native oxide or from silica. The substrates may also comprise a metal having a surface metal oxide layer.

The smooth surface of the first substrate is preferably modified to present proton acceptor groups, which are covalently bonded to the surface. More preferably, the smooth surface of the first substrate is covalently modified to present proton acceptor groups, which comprise at least one of an amino group, an amidine group or a basic nitrogen-containing heterocyclic aromatic group. Most preferably, the smooth surface of the first substrate is covalently modified to present amino groups.

In a preferred embodiment of the invention, the article comprises silicate-containing substrates and, more preferably, comprises silica substrates. Preferably, the smooth surface of the first substrate is covalently modified to present aminoalkyldialkylsilane groups and the smooth surface of the second substrate presents silanol groups.

A number of specific embodiments of the present invention are described in the examples set forth below. These examples are offered by way of illustration and not by way of limitation.

EXAMPLE 1

Preparation of Silica Sheets

Silica sheets were prepared according to the following procedure. A silica tube, having a 14 mm inner diameter and 1 mm thickness, was placed in a laminar flow hood and the end of the tube was sealed with an oxy-hydrogen flame. After heating the closed end for one minute to evaporate surface impurities, the end was removed from the flame and rapidly blown into a large bubble. The bubble was placed near a flame of reduced intensity, and portions were flattened by exposure to radiant heat. The advancing contact angle of water on the freshly prepared silica surface was about 45°. The flattened portions of the silica bubble had a thickness of about 1.0 μm.

Prepared mica patches of about 4 μm thickness were cleaved from a larger sheet of mica for use as a backing sheet. Patches were broken from the flattened portions of the silica bubble and the exterior side (corresponding to the outer surface of the bubble) of each patch was attached to a mica backing sheet. The placement of a mica sheet onto the silica patches was necessary to maintain the cleanliness of the silica surface prior to use. Since charge transfer occurs when a clean silica surface is brought into contact with a clean mica surface, adhesion between the surfaces of the silica patch and the mica backing sheet was spontaneous. The samples were then placed in a vacuum chamber where about 50 nm of silver was evaporated onto the interior sides of the silica patches to form silver-silica-mica structures. The structures were then removed from the vacuum chamber and stored in a desiccator.

Prior to start of an experiment, a sample was prepared for mounting in a Surface Force Apparatus (SFA) by being glued, mica side up, onto a cylindrical silica lens using a low melting point epoxy resin. The mica backing sheet was removed just prior to experimentation.

EXAMPLE 2

Modification of the Surface of a Silica Sheet

The protective mica backing sheet was removed from a silver-silica-mica structure and the silver-silica structure was placed in a sealed glass container, which was partitioned into two compartments by a poly(tetrafluoroethylene) (PTFE) connector. A modifying reagent, 3-aminopropyldimethylethoxysilane, was introduced into a compartment at one end and allowed to react with the silica sheet in the second compartment at the other end of the container via the vapor phase for 24 hours. The PTFE connector prevented the silane liquid from creeping and wetting the silica sheet directly, ensured that the silica was only in contact with the silane through the vapor phase. At the end of the 24 hour period, the modified silica sheet (silylated silica sheet) was removed and mounted in the Surface Force Apparatus.

In addition to reacting with silanol groups on the silica surface, the aminopropylsilane modifying reagent reacts with a second molecule of modifying reagent to form a dimer. An absorbed layer of about 3 nm of silane dimer, which was present on the silica surface, was dissolved by exposing the surface to aqueous solution. To avoid any contamination of the silica surface by the dimer during experimentation, the apparatus was filled, drained, and refilled before liquid phase measurements were taken.

The contact angle of water with the surface of the silylated silica sheet was not measured, but was estimated to be: 45° advancing, 35° receding, ±5°.

In this example and all of the other examples described infra, fluids were filtered through an alumina membrane having a 0.02 μm pore diameter prior to being permitted to come into contact with the silica sheet.

EXAMPLE 3

Preparation of a Clean Silylated Silica Sheet for Experiments with Unsilylated Materials A silylated silica sheet was prepared according to the procedure described in Example 2 but was not allowed to come into contact with aqueous solution. Instead, prior to using the silylated silica sheet in experiments with unsilylated material, the silylated sheet was rinsed in filtered ethanol and blown dry with filtered nitrogen gas prior to mounting in the Surface Force Apparatus. This procedure was sufficient to prevent any possible silane contamination of an opposing, untreated surface.

EXAMPLE 4

Measurement of the Interaction Between a Clean Silylated Silica Sheet and an Untreated Silica Surface Under Dry Conditions The force between an untreated silica surface (prepared according to Example 1) and a surface of a clean silylated silica sheet, modified to present the amino groups according to the procedure of Example 3, was measured under a dry nitrogen gas atmosphere. The experiment was performed using a modified Surface Force Apparatus (SFA), which measures the forces between two surfaces using the deflection of a cantilever spring. The use of the SFA to measure forces and the technique for measuring the amount of charge transferred between two surfaces has been previously reported (see descriptions in D. J. Smith, *J. Electrostat.*, 26, 291 (1991) and in R. G. Horn and D. T. Smith, *Science*, 256, 362 (1992)). Unlike the system presented here, the interfaces described in these earlier publications are between macroscopically dissimilar materials (such as between unmodified silica and mica).

The silica substrates were mounted in a crossed-cylinder geometry to avoid edge effects in the force measurements. Silver layers about 50 nm thick were deposited on the back side of each silica sheet, creating an optical interferometer that was used to measure surface separation. The silvered sheets were glued to cylindrical lenses and the silver layers were connected to an electrometer circuit which permitted the measurement of the amount of charge transferred from one surface to the other on contact. Prior to contact between the two surfaces, no appreciable charge was measured on either of the surfaces. After the surfaces had been brought into contact measurable amount of charge was observed to transfer spontaneously from one surface to the other, the untreated silica surface becoming negatively charged and the amine-modified surface positively charged. In addition, an attractive electrostatic force was measured between the two surfaces after they had been placed in contact, i.e., a significant amount of work per unit of area in contact was required to separate the two surfaces (3.3 J/m$^2$). The surface charge density on each of the surfaces was high enough (about 6.9 mC/m$^2$) that, upon separation of the surfaces, electric discharges were observed. These discharges were evident in the attractive electrostatic force measured between the two surfaces and also in the measured surface charge densities.

The range and magnitude of the attractive force between the amine-modified silica surface and the untreated silica surface is much greater than the attractive forces due to van der Waals bonding. Because of the range and magnitude of the attractive force generated between the amine-modified silica surface and the untreated silica surface, the adhesive energy of the bond between the two surfaces is of the same order of magnitude as the cohesive energy of the silica substrates, i.e., the same order of magnitude as the energy required to fracture the bulk material of the silica substrates.

EXAMPLE 5

Measurement of the Interaction Between a Clean Silylated Silica Sheet and an Untreated Silica Surface Under Aqueous Conditions The same SFA system described in Example 4 was used except that an aqueous sodium chloride solution rather than nitrogen gas was employed as the intervening fluid. The silica surfaces were prepared as described in Examples 1 and 2. An attractive electrostatic double layer interaction was measured, confirming that the two surfaces carried charge of opposite sign. The silica surface and amine-modified silica surface therefore adhere and also demonstrate opposite signs of charge when the surfaces are immersed in water. While the strength and range of the interaction is considerably less than observed when dry nitrogen gas is utilized as the intervening fluid, the interaction is attractive. In contrast, where van der Waals bonding is the sole basis for attraction between two surfaces, such as between two unmodified silica surfaces, no adhesion is seen if the surfaces are immersed in water.

Although the present invention has been described in terms of an exemplary embodiments, it is not limited to these embodiments. Alternative embodiments, examples, and modifications which would still be encompassed by the invention may be made by those skilled in the art, particularly in light of the foregoing teachings. Therefore, the following claims are intended to cover any alternative embodiments, examples, modifications, or equivalents which may be included within the spirit and scope of the invention as defined by the claims.

What is claimed is:

1. A method of adhering substrates consisting essentially of:
    (a) covalently modifying a smooth surface of a first substrate to present groups which are one member of a Bronsted-Lowry acid-base pair; and
    (b) contacting the covalently modified surface with a smooth surface of a second substrate, wherein the smooth surface of the second substrate presents groups which are the acid-base complement of said member of a Bronsted-Lowry acid-base pair on the surface of the first substrate, whereby the smooth surface of the second substrate reformably adheres to the covalently modified surface of the first substrate and wherein the adhering of that two surfaces occurs by means of transfer of a charge between one member of a Bronsted-Lowry acid-base pair on the surface of the first substrate and its complement on the surface of the second substrate.

2. The method of claim 1 wherein the one member of a Bronsted-Lowry acid-base pair includes proton acceptor groups.

3. The method of claim 2 wherein covalently modifying the smooth surface of the first substrate consists essentially of covalently modifying the smooth surface of a silica substrate to present amino groups.

4. The method of claim 2 wherein contacting the covalently modified surface with a smooth surface of a second substrate consists essentially of contacting the covalently modified surface with the smooth surface of a second substrate which presents amphoteric hydroxyl groups.

5. The method of claim 4 consisting essentially of contacting the covalently modified surface with the smooth surface of a second substrate which presents silanol groups.

6. The method of claim 1 wherein covalently modifying the smooth surface of the first substrate consists essentially of reacting the smooth surface of the first substrate with an aminoalkyldialkylalkoxysilane.

7. The method of claim 6 wherein covalently modifying the smooth surface of the first substrate consists essentially of reacting the smooth surface of a silica substrate with an aminoalkyldialkylalkoxysilane.

8. The method of claim 7 wherein reacting the smooth surface of the silica substrate with the aminoalkyldialkylalkoxysilane consists essentially of vapor-phase treating the surface with the aminoalkyldialkylalkoxysilane.

9. The method of claim 1 wherein the first substrate is a nonmetallic inorganic material and the second substrate is a nonmetallic inorganic material.

10. The method of claim 1 wherein the one member of a Bronsted-Lowry acid-base pair includes proton donor groups.

11. The method of claim 1, wherein the transfer of a charge between one member of a Bronsted-Lowry acid-base pair on the surface of the first substrate and its complement on the surface of the second substrate occurs by transfer of a proton.

12. The method of claim 11, wherein the thickness of the covalently modified surface is no more than about 1.0 nm.

13. A method of bonding substrates consisting essentially of:
    (a) modifying a smooth surface of a first substrate by covalently bonding a monolayer of a modifying agent to the surface, the modifying agent including a group which is one member of a Bronsted-Lowry acid-base pair; and
    (b) contacting the covalently modified surface with a smooth surface of a second substrate, wherein the smooth surface of the second substrate presents groups complements which are the acid-base complement of said member of a Bronsted-Lowry acid-base pair on the surface of the first substrate, whereby the smooth surface of the second substrate reformably adheres to the covalently modified surface of the first substrate and wherein the adhering of the two surfaces occurs by means of transfer of a charge between one member of a Bronsted-Lowry acid-base pair on the surface of the first substrate and its complement on the surface of the second substrate.

14. The method of claim 13 consisting essentially of modifying the smooth surface of the first substrate by covalently bonding a monolayer of the modifying agent to the surface, wherein the modifying agent includes a proton acceptor group.

15. The method of claim 13, wherein the transfer of a charge between one member of a Bronsted-Lowry acid-base pair on the surface of the first substrate and its complement on the surface of the second substrate occurs by transfer of a proton.

16. The method of claim 15, wherein the thickness of the covalently modified surface is no more than about 2.0 nm.

17. A method of adhering substrates consisting essentially of:
    (a) covalently modifying a smooth surface of a first substrate to present groups which are one member of a Bronsted Lowry acid-base pair; and
    (b) modifying a smooth surface of a second substrate to present groups which complement the Bronsted-Lowry groups on the smooth surface of the first substrate; and
    (c) contacting the covalently modified surface of the first substrate with the modified smooth surface of the second substrate, whereby the modified smooth surface of the second substrate reformably adheres to the covalently modified surface of the first substrate and wherein the adhering of the two surfaces occurs by means of transfer of a charge between one member of a Bronsted-Lowry acid-base pair on the surface of the first substrate and its complement on the surface of the second substrate.

18. An article comprising:
(a) a first substrate comprising a smooth surface, presenting groups which are one member of a Bronsted-Lowry acid-base pair, covalently bonded to the surface;
(b) a second substrate comprising a smooth surface presenting complements which are the acid-base complement of said member of a Bronsted-Lowry acid-base pair on the surface of the first substrate; and
wherein the smooth surface of the second substrate is reformably adhered to the covalently modified surface of the first substrate and wherein the adhering of the two surfaces occurs by means of transfer of a charge between one member of a Bronsted-Lowry acid-base pair on the surface of the first substrate and its complement on the surface of the second substrate.

19. The article of claim 18 wherein the substrates comprise a nonmetallic, inorganic material.

20. The article of claim 19 wherein the substrates comprise silica.

21. The article of claim 18 wherein the substrates comprise silica, oxidized silicon, alumina, titanium oxide, chromium oxide, tin oxide, germanium oxide, or a silicate-containing material.

22. The article of claim 18 wherein the smooth surface of the first substrate is modified to present proton acceptor groups, which are covalently bonded to the surface.

23. The article of claim 22 wherein the proton acceptor groups comprise at least one of an amino group, an amidine group or a basic nitrogen-containing heterocyclic aromatic group.

24. The article of claim 18 wherein the first substrate comprises silica and the smooth surface of the silica substrate is modified to present aminoalkyldialkylsilane groups covalently bonded to the surface.

25. The article of claim 18, wherein the transfer of a charge between one member of a Bronsted-Lowry acid-base pair on the surface of the first substrate and its complement on the surface of the second substrate occurs by transfer of a proton.

26. The article of claim 25, wherein the thickness of the covalently modified surface is no more than about 1.0 nm.

27. The article of claim 25, wherein the thickness of the covalently modified surface is no more than about 2.0 nm.

* * * * *